United States Patent [19]
Dickinson

[11] 4,217,125
[45] Aug. 12, 1980

[54] METHOD AND APPARATUS FOR MANUFACTURING FLAT GLASS ON A MOLTEN METAL BATH

[75] Inventor: George A. Dickinson, St. Helens, England

[73] Assignee: Pilkington Brothers Limited, St. Helens, England

[21] Appl. No.: 527,615

[22] Filed: Nov. 27, 1974

[30] Foreign Application Priority Data

Dec. 12, 1973 [GB] United Kingdom ............... 57661/73

[51] Int. Cl.$^2$ ............................................. C03B 18/02
[52] U.S. Cl. .................................. 65/99 A; 65/182 R
[58] Field of Search ................. 65/65 A, 99 A, 182 R

[56] References Cited

U.S. PATENT DOCUMENTS

| | | | |
|---|---|---|---|
| 3,479,171 | 11/1969 | Robinson et al. | 65/182 R X |
| 3,539,320 | 11/1970 | Plumat et al. | 65/182 R X |
| 3,607,199 | 9/1971 | Itakura et al. | 65/99 A X |

Primary Examiner—Arthur D. Kellogg
Attorney, Agent, or Firm—Burns, Doane, Swecker & Mathis

[57] ABSTRACT

Flat glass is manufactured by the float process and is attenuated to a thickness in the range 1.5 mm to 5 mm. In an attenuation zone of the bath the viscosity of the glass is controlled to regulate attenuation of the float ribbon to a desired width and thickness and transverse barriers are provided on the floor of the tank structure, containing the molten metal along which the ribbon is advanced, to constrain to forward flow the molten metal entrained beneath the ribbon. Upstream counterflow from the cooler end of the tank structure is alongside the ribbon and replenishes the molten metal beneath the ribbon between that transverse barrier and an upstream similar transverse barrier.

21 Claims, 8 Drawing Figures

METHOD AND APPARATUS FOR MANUFACTURING FLAT GLASS ON A MOLTEN METAL BATH

BACKGROUND OF THE INVENTION

1. Field of the Invention

This invention relates to the manufacture of flat glass. More particularly the invention relates to the manufacture of thin flat glass by the float process for example, float glass of thickness in the range 1.5 mm to 5 mm and more especially in the range 2 mm to 3 mm.

In the float process for flat glass manufacture, molten glass is delivered at a controlled rate on to one end, the hot end, of a molten metal bath contained in an elongated tank structure. Usually the molten metal bath is of molten tin or of a molten tin alloy in which tin predominates.

The final ribbon of glass is discharged from the bath by traction means, usually driven traction rollers, disposed beyond the outlet end of the bath, which traction means applied tractive force to advance the ribbon along the bath.

2. Description of the Prior Art

In some ways of operating the float process, regulation of the applied tractive effort is effected along with regulation of the thermal conditions to which the advancing ribbon of glass is subjected so as to attenuate the ribbon to a desired width and thickness. Outwardly and longitudinally directed marginal forces may be applied to the glass while it is being attenuated so as to control gradual and progressive reduction of width and thickness of the ribbon until the ribbon of glass reaches a desired width and thickness. The thermal control is such that when the desired width and thickness of the ribbon is achieved, the viscosity of the glass is at a value at which further dimensional change cannot take place under the applied tractive effort.

Usually the thermal regime to which the glass is subjected is such that the ribbon of glass passes along a zone of the bath where the viscosity of the glass is controlled to regulate the attenuation of the ribbon and in this zone of the bath the glass accelerates as the controlled attenuation takes place.

When operating under high load conditions for example at a rate of delivery of molten glass to the bath of 2000 tonnes per week or more, the speed of discharge of the ultimate ribbon of glass from the bath is high, for example 10 meters per minute up to 40 meters per minute. Such high speeds are necessary when attenuating the glass under these high load conditions to thicknesses below 3 millimeters, for example in the range 2 mm to 3 mm.

The advancing ribbon of glass, when it is accelerating during attenuation and when it is advancing at uniform high speed for discharge from the bath, entrains an appreciable quantity of the molten metal of the bath along the bath surface towards the outlet end of the bath which surface flow induces an upstream return flow of cooler molten metal from the outlet end of the bath along the bottom of the bath towards the zone of the bath where the ribbon of glass is being attenuated and is at a viscosity such that it is particularly susceptible to temperature variations across the surface of the molten metal bath. It has been found that distortion introduced into the underface of the ribbon of glass in this attenuation zone is present in the ultimate ribbon.

One way of minimising distortion in the underface of the ribbon when producing thin float glass at high speeds is to create mixing currents in the molten metal of the bath in the attenuation zone so as to combat localised temperature gradients along the glass-supporting molten metal surface and thereby minimise surface distortion in the attenuated ribbon. These mixing currents have been created by electromagnetically inducing transverse surface flows of molten metal across the bath surface in that zone.

It has now been found that when producing float glass at loads above 2000 tonnes per week the undersurface of the glass is particularly subject to distortion known as "bands" which takes the form of corrugations in the glass which may be associated with some thickness variation. These so-called "bands" may be a few centimeters wide and a meter or more in length.

It has also been found that a ribbon of thin float glass travelling at a relatively high speed along the outlet end of the bath may be subject to instability in position on the bath by movement of the ribbon from side to side in a periodic manner. This phenomenon known as "snaking" may build up to an amplitude of up to 30 cm to either side of the centre line of the bath with a periodicity of about 5 or 6 minutes. Such movement of the ribbon is undesirable, particularly when the process is operating with automated cutting at the outlet end of the lehr.

It is a main object of the present invention to provide an improved method and apparatus for manufacturing flat glass on a molten metal bath which minimises these difficulties associated with the high speed production of thin float glass.

SUMMARY

The invention provides a method and apparatus for manufacturing flat glass. A ribbon of glass is advanced along a molten metal bath, and the speed of advance of the glass is controlled to a zone of the bath where the viscosity of the glass is controlled to regulate attenuation of the ribbon to a desired width and thickness as it is accelerated. Molten metal flow is constrained at a first location in the region of the downstream end of said zone, to forward flow of molten metal entrained beneath the ribbon and counterflow of molten metal to replenish the molten metal of the bath alongside the ribbon between that location and a second location spaced upstream of said first location in the region of maximum acceleration of the glass where molten metal beneath the ribbon is also constrained to forward flow entrained by the accelerating glass.

Preferably the counterflow at the first location is directed alongside the ribbon. This prevents upstream flow of cooler molten metal beneath the ribbon from the region downstream of the first location. The upstream return flow is instead diverted into a counterflow feeding the sides of the bath in the region between those locations. The glass is accelerating in that region, the depth of the entrained forward flow of molten metal progressively increases, and the constraint of molten metal flow beneath the ribbon to forward flow only at the first location is accompanied by continual diversion upstream of a return flow beneath the forward flow thereby setting up a continual circulation of molten metal in that region, into which circulation the counterflow of molten metal is drawn to replenish the molten metal of that region of the bath.

The zone between the first and second locations may be transversely divided into a plurality of cells, and constraining molten metal flow between each pair of adjacent cells to the forward flow entrained beneath the ribbon and counterflows of molten metal alongside the ribbon from the downstream cell of that pair to the upstream cell of that pair.

In a preferred embodiment there is a first transverse barrier on the floor of the tank structure and extending beyond the position of the edges of the ribbon at the downstream end of said zone, the top of which barrier is positioned below the level of the bath surface by a distance which is effective to constrain to forward flow the molten metal entrained beneath the ribbon and counterflow of molten metal alongside the ribbon, and a second transverse barrier spaced upstream from said first barrier and extending beyond the edges of the ribbon in the region of maximum acceleration of the glass in said zone, the top of which second barrier is positioned below the level of the bath surface by a distance which is effective to constrain molten metal flow beneath the ribbon to forward flow entrained by the accelerating glass.

Additional transverse barriers may be located on the floor of the tank structure in said zone dividing the region between the said first and second barriers into a plurality of cells.

DESCRIPTION OF THE PREFERRED EMBODIMENTS

Figure 1:
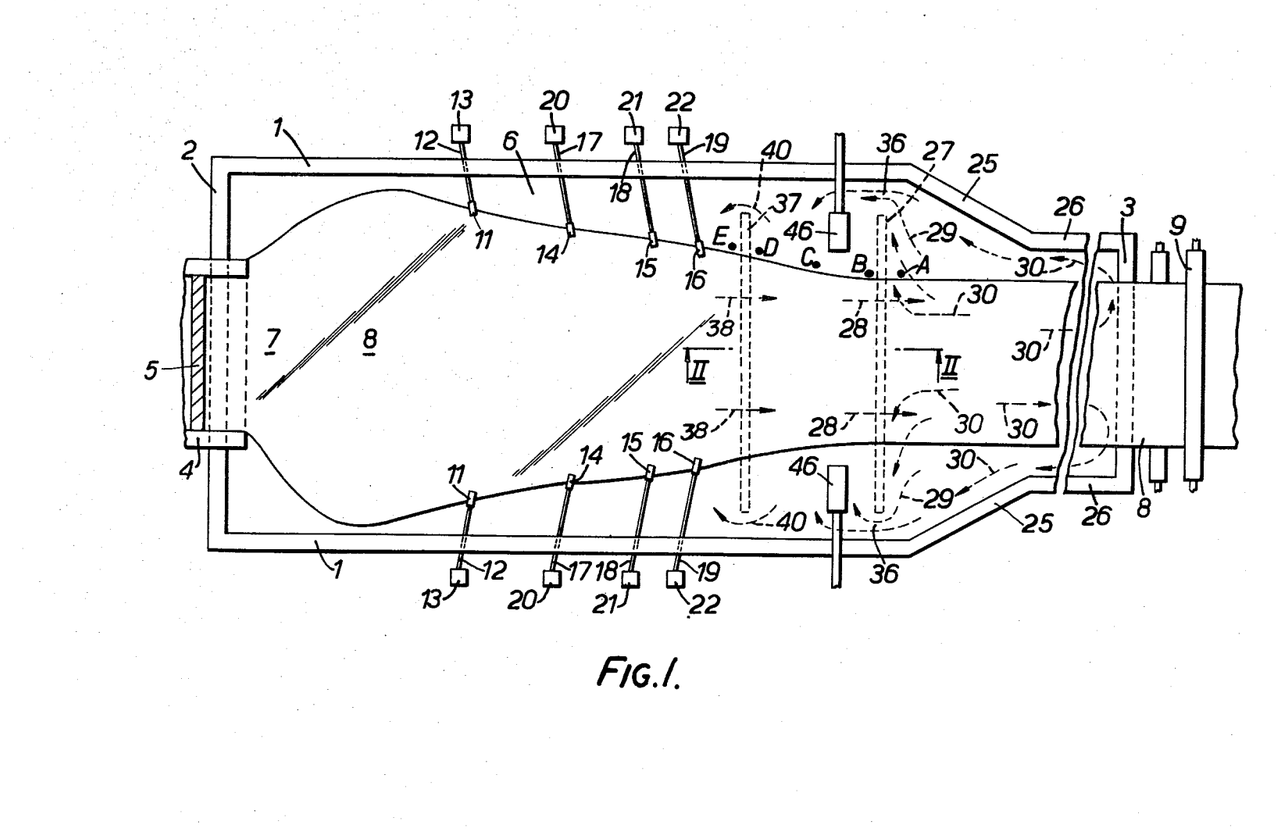
FIG. 1 is a plan view of an elongated tank structure containing a bath of molten metal for use in the float process for the manufacture of thin flat glass by the method of the invention.

Referring to the drawings FIG. 1 illustrates in plan an elongated tank structure for the manufacture of thin glass by the float process. The tank structure comprises side walls 1, an end wall 2 at the inlet end of the tank structure, and an end wall 3 at the outlet end and contains a bath of molten tin. The geometry of the tank structure is such that it will accommodate the maximum possible width of ribbon of glass produced at the hot inlet end of the tank structure by the unhindered lateral flow of molten glass on the bath surface.

Molten soda-lime-silica glass is delivered onto the bath, which is usually of molten tin, at the inlet end of the tank structure by pouring from a spout 4 which extends over the inlet end wall 2 of the tank structure. A regulating tweel 5 controls the rate of flow of molten glass over the spout onto the bath surface 6, which rate of flow in the preferred example to be described is 2100 tonnes per week.

In manner well known in the float process temperature regulators, not shown, are provided in the roof structure over the molten metal bath. Temperature conditions at the inlet end of the bath are such that the molten glass 7 arriving on the bath is permitted to flow freely, laterally unhindered, to the limit of its free flow during the first part of its advance along the bath.

The temperature regulators in the roof structure set a temperature regime to which the advancing glass is subjected, which regime maintains the glass in a deformable state over a longitudinally extending region of the ribbon in which the glass is progressively attenuated as its velocity increases under the influence of tractive effort applied to the ultimate ribbon of glass 8 which is produced by driven rollers 9 located beyond the outlet end wall 3 of the tank structure.

The temperature of the glass is about 990° C. when maximum spread is achieved and the glass thickness is about 7 mm. This layer of molten glass is advanced in ribbon form and the ribbon is constituted by low viscosity glass, e.g. at a viscosity of about $10^{4.8}$ poises. This glass is gradually cooled during its initial advance along the bath and its viscosity slowly increases. As the viscosity of the glass increases so does the influence of the longitudinally directed tractive force, originating from the rollers 9, in stretching the ribbon of glass. Gradual and progressive reduction in width and thickness of the glass is controlled by the use of top rolls which engage the upper surfaces of the margins of the glass.

Initially while the glass is at low viscosity a pair of inclined top rolls 11 mounted on shafts 12 driven by motors 13 are mounted through the tank side walls to engage the margins of the ribbon. The top rolls 11 are knurled graphite, stainless steel, or mild steel rolls which are internally water cooled and are inclined at an angle of 3° to an axis at right angles to the direction of advance of the ribbon of glass along the bath. The rolls 11 are driven at a speed of 1.5 meters per minute. Outwardly and longitudinally directed forces are thereby applied to the margins of the nascent ribbon. The outward force components provide restraint against undue loss in width. Slight attenuation of the ribbon is beginning to occur in this region.

Further pairs of top rolls 14, 15 and 16 are provided spaced along the tank structure, being mounted on respective shafts 17, 18 and 19 and driven by motors 20, 21 and 22.

The top rolls 14 are set at an angle of 4° to an axis at right angles to the direction of advance of the ribbon and are driven at a rate of 1.8 meters per minute.

The top rolls 15 are set at an angle of 6° and are driven at a rate of 2.4 meters per minute.

The top rolls 16 are set at an angle of 9° and are driven at a rate of 3.4 meters per minute.

These sets of top rolls act to avoid undue loss of ribbon width as the glass is being accelerated from about 1.5 meters per minute to about 3.4 meters per minute. As the glass passes beyond the top rolls 16 its temperature is cooling below 880° C. corresponding to a viscosity of about $10^{5.2}$ poises. The glass thickness is about 4.5 mm.

The ultimate ribbon of glass 8 which is 2.5 mm thick is discharged from the bath by the rollers 9 at a speed of 10.4 meters per minute and after the glass passes downstream of the last pair of top rolls 16 it is subjected to varying acceleration which reaches a maximum at a distance just downstream of the top rolls 16. The glass is rapidly thinned to 2.5 mm and the attenuation takes place against the reaction provided by the upstream part of the ribbon of glass engaged by the top rolls 11, 14, 15 and 16 as well as by the entrainment by the undersurface of the ribbon of a forward flow of molten metal of the bath along the bath surface beneath the accelerating ribbon. As the ribbon speed increases so force is dissipated in accelerating the forward flow of molten metal entrained by the ribbon and molten metal is drawn inwardly beneath the ribbon from the sides of the bath to compensate for the entrainment of molten metal. This forward flow of molten metal along the surface of the bath becomes considerable as the ribbon speed increases, for example up to a discharge speed greater than 10 meters per minute, and there is engendered a return flow along the bottom of the bath of cooler molten metal. It is this generalised return flow of cooler molten metal along the bottom of the bath which produces top to bottom temperature gradients through the depth of the bath which have been shown to be particularly troublesome in the region of the bath where the rapidly accelerating ribbon is being attenuated.

The side walls 1 of the tank structure are inclined inwardly near the outlet end of the bath to form shoulders 25 which connect the wider part of the tank where the formation of the ribbon and its attenuation takes place, to a laterally constricted part of the tank at the outlet end having side walls 26. The narrowing of the tank structure at the outlet end brings the tank width to a dimension greater than the maximum width of the ultimate ribbon of thin glass 8 to be produced and the use of a tank structure with a laterally constricted outlet end intensifies the pumping effect of the entrained forward flow of molten metal and enhances the upstream bottom flow of cooler molten metal.

Under the influence of tractive force which discharges the ribbon 8 which is 2.5 mm thick from the bath at a speed of about 10.4 meters per minute, the glass is in a condition in which no further dimensional change can take place under the influence of that tractive effort, when the viscosity of the glass is about $10^7$ poises corresponding to a temperature of about 750° C. for the usual soda-lime-silica glass. The downstream end of the attenuation zone is therefore in the region where no further change in width of the ribbon takes place and at a first location in the region of the downstream end of the zone there is located a first transverse barrier 27 which is operative to constrain molten metal flow in the region of the downstream end of the attenuation zone to forward flow of molten metal, indicated by the arrows 28 entrained beneath the high speed ribbon of glass, and counterflow of molten metal indicated by the arrows 29 alongside the ribbon. The generation of the return flow of cooler molten metal from the outlet end of the bath is indicated by arrows 30. This return flow along the bottom of the outlet end of the bath feeds the counterflow 29.

Figure 2:
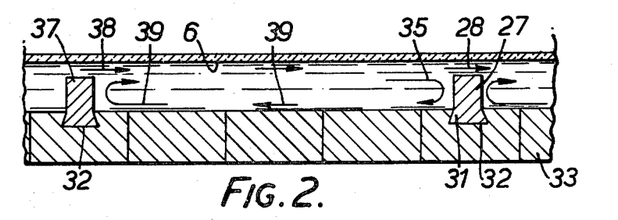
FIG. 2 is a section on line II—II of FIG. 1 showing transverse barriers in the tank structure.
Figure 3:
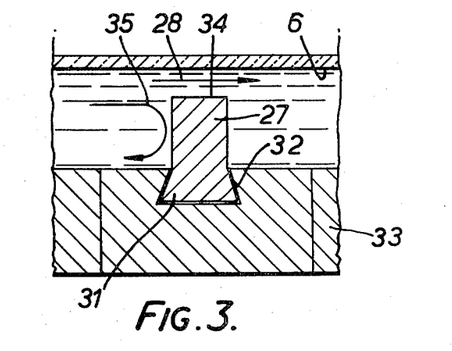
FIG. 3 is an enlarged detailed view of one of the transverse barriers of FIGS. 1 and 2 keyed into a groove in the floor of the tank structure.

As shown in FIGS. 2 and 3 the barrier 27 is a carbon bar of upstanding rectangular cross-section and has a dove-tail base 31 which is keyed into a matching dove-tail groove 32 formed transversely of the bath in the floor 33 of the tank structure. The flat top of the bar is about 5 cm long in the direction of ribbon advance and is spaced from the level of the bath surface 6 by a sufficient depth to ensure that the lower layers of entrained molten metal of the forward flow are directed downwardly as indicated by the arrow 35 to feed a return flow 39 along the bath bottom in the region upstream of the barrier 27, which is not at a substantially lower temperature than the forward flow.

Usually the top surface 34 of the barrier 27 is from 6 mm to 15 mm below the level of the bath surface, depending on the speed and acceleration of the ribbon, which distance ensures sufficient pressure gradient in the forward flow 28 which is constrained over the top surface 34 of the barrier to ensure effective obstruction of any upstream flow of cooler molten metal along the bottom of the bath beneath the ribbon of glass.

In principle it is desirable that the top of the barrier 27 may be at a depth below the level of the bath surface 6 which is exactly such that all the entrained molten metal of the forward flow 28 travels over the barrier but none of the molten metal of the return flows 30 passes over the barrier. In practice, however, such an exact setting may be difficult to achieve and the barrier height is therefore preferably set as described above to direct the lower layers of entrained molten metal of the forward flow downwardly as indicated at 35 thereby ensuring that molten metal flow over the barrier is constrained to forward flow.

The return flows 30 of cooler molten metal from the outlet end of the bath are thereby effectively directed by the barrier 27 into the counterflows 29 alongside the ribbon.

The ends of the bar 27 are spaced from the side walls 1 of the tank structure to define channels 36 for the counterflows 29 of cooler molten metal from the outlet end of the bath. These counterflows are therefore directed alongside the ribbon edges into the region of the bath upstream of the barrier 25. The channels 36 are preferably clearly defined for high speed operation and for operating at the lower end of such high speed ranges the ends of the bar 27 may extend right up to the side walls 1 of the tank structure, the counterflows 29 of molten metal taking place over the top of the bar alongside the path of travel of the ribbon.

As the ribbon is accelerating in the attenuation zone there is progressively increasing entrainment of molten metal into the forward flow since the acceleration of the glass is such that the increase in area of the ribbon per unit time, and hence the amount of entrained molten metal, increases along the attenuation zone. Molten metal is therefore being drawn continuously under the ribbon to compensate for that removed by the entrainment.

The counterflows 29 of molten metal alongside either side of the ribbon replenish the molten metal of the bath between the location of the first barrier 27 at the downstream end of the attenuation zone and a second location defined by the position of a second barrier 37 similar in construction and arrangement to the barrier 27 and located in the region of maximum acceleration of the glass. The top surface of both barriers 27 and 37 may be at the same depth, for example 6 mm below the level of the bath surface, or the depths may differ, for example the top surface of barrier 37 at a depth of 10 mm and the top surface of barrier 27 at a depth of 6 mm.

The barrier 37 is also effective to constrain molten metal flow beneath the ribbon to the forward flow 38 of molten metal entrained by the accelerating glass. There is counterflow 40 of cooler molten metal from the region between the two barriers 37 and 27 into the upstream region of the bath where the glass is not so susceptible to distortion as it is in the region between the two barriers.

The return flow along the bath bottom between the two barriers 37 and 27 is indicated at 39 in FIG. 2 and is directed upwardly when it reaches the barrier 37, to feed the forward flow 38 downstream of the barrier 37. A continual circulation is thereby set up in the region between the two barriers into which circulation the counterflows 29 are drawn to become entrained in that circulation and in the forward flow 28. Replenishment of the molten metal supporting the accelerating glass is thereby achieved with temperature differences between the top and bottom of the bath kept to a minimum.

In this way cooler molten metal which is forced upstream from the outlet end of the bath by the pumping effect of the entrained forward flow of molten metal moving with the ribbon of glass, is prevented from flowing directly beneath the ribbon of glass which is being attenuated but rather is diverted by the barrier 27 and is heated as it is diverted to a temperature more nearly approaching that of the molten metal supporting the glass being attenuated, so that by the time the counterflows 29 of cooler molten metal have been drawn into the region of the bath supporting the glass being attenuated, the temperature of that molten metal is not greatly different from the temperature of the entrained forward flow of molten metal 28.

It has been found in practice that temperature differences between the top and bottom of the molten tin in the region just upstream of the barrier 27 are not more than 15° C.

In the same way any molten metal from the counterflows 40 around the ends of the upstream barrier 37 which are drawn into the entrained forward flow 41 of molten metal which is being accelerated with the accelerating glass, is molten metal which has been heated in the region between the two barriers to a temperature not greatly different from the temperature of the glass upstream of the barrier 37.

Thus the molten metal being drawn into the entrained forward flow as the glass accelerates is at a temperature not greatly different from that of the molten metal being carried along beneath the ribbon; top to bottom temperature differences are substantially reduced and the possibility of bottom surface "band" distortion in the thin float glass is greatly reduced.

In the embodiment described with reference to FIGS. 1 and 2 top and bottom bath temperatures were measured using thermocouples in positions marked on FIG. 1, namely position A just downstream of the barrier 27, position B just upstream of the barrier 27, position C midway between the barriers 27 and 37, position D just downstream of the barrier 37 and position E just upstream of the barrier 37 between the barrier 37 and the edge rolls 16. All temperature measurements were made just alongside one edge of the ribbon and the measurements made are set out in the following Table.

TABLE

| Position | Top Bath Temperature (°C.) | Bottom Bath Temperature (°C.) |
|---|---|---|
| A | 786 | 774 |
| B | 790 | 783 |
| C | 812 | 797 |
| D | 822 | 810 |
| E | 824 | 820 |

These results show that between the two barriers thermal control is achieved by the invention to produce top to bottom temperature differences in the bath metal of 15° C. or less and generally in the range 5° C. to 10° C. In the region of maximum acceleration as represented by position D a temperature difference of 12° C. was measured. Temperature regulation may be improved by the use of additional transverse barriers on the floor of the tank structure in the attenuation zone dividing the region between the first barrier 27 and the second barrier 37 into a plurality of cells.

Figure 4:
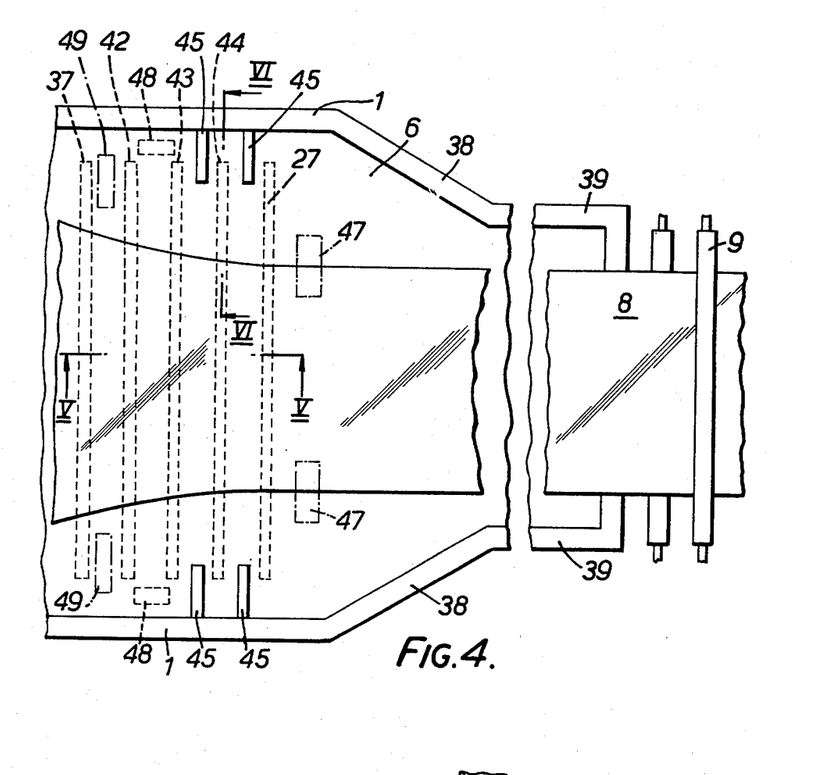
FIG. 4 is a plan view of the outlet end of the tank structure in another embodiment of the invention in which the region between the two barriers of FIGS. 1 and 2 is divided into a plurality of cells by additional transverse barriers.
Figure 5:
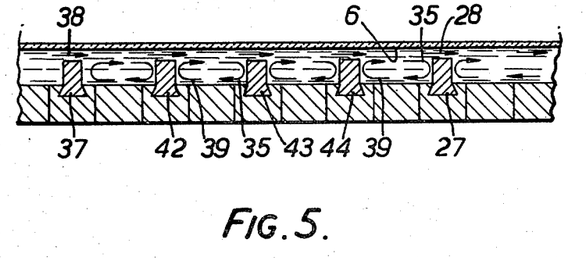
FIG. 5 is a section on line V—V of FIG. 4.

Such an arrangement with three additional barriers 42, 43 and 44 is illustrated in FIGS. 4 and 5. These barriers are of similar construction to the barries 27 and 37 with a gap usually in the range 6 mm to 15 mm between the flat top of each barrier and the bath surface. Because the depth of gap to constrain molten metal flow to forward flow depends on the speed of the glass advancing over a particular barrier it will be appreciated that a different gap may be employed over the barrier 37 than over the barrier 27, and the gap between each barrier and the bath surface may progressively change from the upstream end to the downstream end of the attenuation zone.

The ends of each of the barriers are spaced from the tank side walls so that counterflows take place around the ends of each barrier. The attenuation zone is thus divided into four cells, which number is effective to maintain a temperature difference, preferably in the range 5° C. to 10° C., between the top and bottom of the tin depth in each cell. The flow of molten metal between each pair of adjacent cells is constrained to the forward flow entrained beneath the ribbon over the barrier between those adjacent cells and the counterflow of molten metal taking place alongside the ribbon from the downstream cell of that pair to the upstream cell of that pair.

The length of each cell in the direction of ribbon advance is such that there is an internal molten metal circulation in each cell as shown in FIG. 5, and the counterflows around the ends of each barrier are entrained into the molten metal flows within the upstream cell of the pair and does not substantially by-pass a cell. In this way molten metal entrained into the forward flow in the region of each cell is obtained from the downstream cell, that is the molten metal entrained is already at a temperature near to that of the molten metal already in the cell and no substantial temperature difference will exist at any location in the attenuation zone between the forward flow under the ribbon and the molten metal being entrained into that forward flow as the glass accelerates.

A further advantage of using a plurality of barriers, as in FIGS. 4 and 5, is to accommodate different operational settings which will cause a shift in the position of maximum acceleration of the glass. When operating according to the Example which has been described with an output speed of about 10.4 metres per minute the position of maximum acceleration of the glass is in the region of the barrier 37. As the speed of the ultimate ribbon is increased either to accommodate higher load operation or to decrease the thickness of the glass, the position of maximum acceleration may move downstream and the provision of the plurality of barriers ensures that for all expected operational settings one of the transverse barriers will be in the region of maximum acceleration of the attenuating glass.

The ribbon of glass may be discharged from the bath at a temperature of about 650° C. so that the cooler molten metal moving upstream along the bottom of the bath is at a temperature of about 650° C. to 700° C. The deceleration of this upstream flow as it enters the widening part of the bath between the shoulders 30 and is diverted by the barrier 25, assists thermal exchange due to the high conductivity of the molten tin to accomplish the required heating of the cooler molten metal so that it is at a temperature of about 770° C. to 775° C. by the time it is flowing into the counterflows 29 around the ends of the barrier 27.

Figure 6:
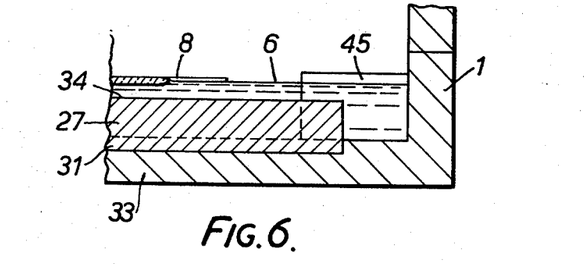
FIG. 6 is a section on line VI—VI of FIG. 4.

Thermal exchange may be further assisted by defining a tortuous path for the counterflows between the cells, by means of lateral baffles 45 of carbon which are illustrated in FIGS. 4 and 6 which extend from the side walls 1 between the barriers 27 and 44 and the barriers 43 and 44. These barriers intersect the bath surface and thereby ensure that the counterflows cannot by-pass the cells.

Additionally the mixing of the counterflows with the flows in the region between the barriers may be assisted by employing linear induction motors 46, FIG. 1, mounted above the bath surface to induce flows of molten metal from the counterflows 29 to enter beneath the accelerating ribbon.

Linear induction motors may also be positioned as indicated at 47 in FIG. 4 to assist diversion of the return flows 30 into the counterflows 29. Further linear induction motors may be positioned as indicated at 48 and 49, to direct the counterflows. Immersed heaters may also be employed in conjunction with or in place of the linear induction motors at positions 48 and 49 to assist further the achievement of thermal homogeneity in the region where acceleration of the glass is high.

Figure 7:
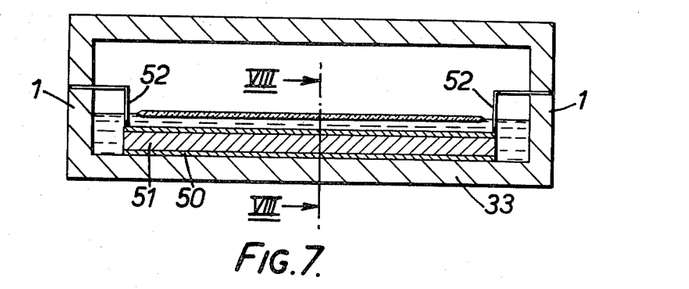
FIG. 7 is a transverse cross-section through a tank structure containing a bath of molten metal showing a transverse barrier of cylindrical form seated on the floor of the tank structure beneath the ribbon of glass.
Figure 8:
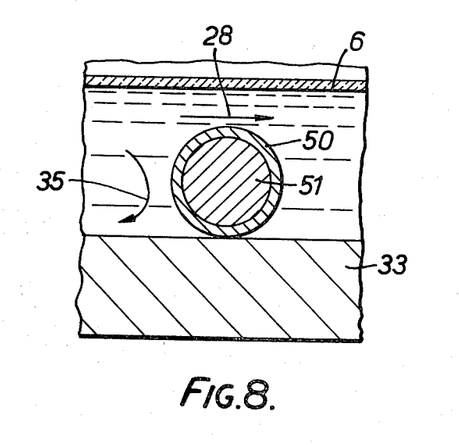
FIG. 8 is a section on line VIII—VIII of FIG. 7.

Barriers of cylindrical form located on the floor of the tank structure may be used as illustrated in FIGS. 7 and 8.

According to this modification each barrier may comprise a carbon cylindrical sleeve 50 machined from hard graphite material which surrounds a tungsten core 51 in the form of a tungsten rod. The diameter of such a barrier is such as to leave the appropriate gap for example in the range 6 mm to 15 mm between the top of the barrier and the surface of the molten metal bath so that the constrained forward flow 28 takes place over the cylindrical surface of the barrier.

The barrier may be slid into the tank structure from the side and then simply rolled into the location which achieves on optimum result in the sense of a minimum temperature difference from top to bottom of the bath depth and then held in position for example by means of a carbon forks indicated at 52, extending downwardly over the ends of the barrier alongside the ribbon of glass. With a change in operational conditions the barrier can then be moved easily by rolling along the floor of the tank structure. Such a barrier enhances streamlined flow in the entrained forward flow 28 of molten metal and in the diverted return flow 35. The tungsten core, being a metal which is of greater density than molten tin, ensures that the cylindrical barrier seats firmly onto the floor of the tank structure and effectively obstructs upstream flows of cooler molten metal along the bottom of the bath.

The invention thus enhances the provision of conditions of thermal homogeneity across the molten metal surface supporting and contacting the bottom surface of the ribbon of glass when it is in the critical condition of being accelerated to attenuate the ribbon, at the same time as the viscosity of the glass is increasing to a value at which any distortions introduced into that surface are retained in the ultimate ribbon. Further the symmetrical control of molten metal flows in the region of the attenuation zone and at the outlet end of the bath, by employing the method and apparatus of the invention, has enhanced the stability of the process by avoiding "snaking" of the ribbon of glass and maintaining the physical location of the ribbon on the discharge rollers 9 as it is delivered to the annealing lehr.

The invention can be applied to any method and apparatus for float glass manufacture, employing either a parallel-sided bath without restricted outlet end or a bath with a restricted outlet end as illustrated in FIGS. 1 and 4, and in which a glass ribbon is advanced through an attenuation zone in which the glass is accelerated to a high speed for discharge from the bath. For example the invention may be applied to a process in which the advancing ribbon is stiffened and gripped prior to being reheated to a viscosity at which it can be attenuated.

I claim:

1. Apparatus for manufacturing flat glass comprising an elongated tank structure, having side walls for containing a bath of molten metal, means for delivering glass to the bath at a controlled rate and advancing the glass in ribbon form along the bath, thermal regulators in the tank structure for cooling the advancing ribbon through a viscosity range in which the glass can be attenuated in a zone of the bath sufficiently downstream for such attenuation, means for applying traction to the ultimate ribbon of glass, a first transverse barrier on the floor of the tank structure at the downstream end of said zone, which first barrier extends beyond the position of the edges of the ribbon at the downstream end of said zone but short of said side walls, the top of which first barrier is positioned below the level of the bath surface by a distance which is effective to constrain molten metal flow beneath the ribbon to forward flow of the molten metal entrained beneath the ribbon and counterflow of molten metal alongside the ribbon to replenish molten metal in said attenuation zone, and a second transverse barrier spaced upstream from said first barrier in the region of maximum acceleration of the glass in said zone, the top of which second barrier is positioned below the level of the bath surface by a distance which is effective to constrain molten metal flow beneath the ribbon to forward flow entrained by the accelerating glass, said first and second transverse barriers being arranged and spaced apart to establish lateral paths for inward molten metal flows from said counterflow to replenish the molten metal in said attenuation zone.

2. Apparatus according to claim 1, wherein the ends of said first and second barriers are spaced from the side walls of the tank structure to define channels for counterflows of molten metal alongside the ribbon edges.

3. Apparatus according to claim 1, comprising additional transverse barriers on the floor of the tank structure in said zone dividing the region between said first and second barriers into a plurality of cells, the top of each additional barrier being positioned below the level of the bath surface by a distance which constrains molten metal flow to forward flow of molten metal entrained beneath the ribbon and counterflow of molten metal alongside the ribbon.

4. Apparatus according to claim 3, wherein the ends of each of said additional barriers are spaced from the side walls of the tank structure to define channels for counterflows of molten metal alongside the ribbon edges.

5. Apparatus according to claim 3, wherein each of said additional barriers has a flat top parallel to the level of the bath surface and spaced from 6 mm to 15 mm below the level of the bath surface.

6. Apparatus according to claim 1, wherein each of said first and second barriers has a flat top parallel to the level of the bath surface and spaced from 6 mm to 15 mm below the level of the bath surface.

7. Apparatus according to claim 1, wherein at least one of said first and second barriers is a bar of upstanding rectangular cross-section keyed into a dove-tail groove formed transversely of the bath in the floor of the tank structure.

8. Apparatus according to claim 7, wherein said bar is a carbon bar.

9. Apparatus according to claim 1, wherein at least one of said first and second barriers is of cylindrical form and is located on the floor of the tank structure.

10. Apparatus according to claim 9, wherein said at least one barrier comprises a cylindrical sleeve of carbon with a tungsten core.

11. A method of manufacturing flat glass comprising:
advancing a ribbon of glass along a molten metal bath;
attenuating the advancing glass by applying traction to the ribbon and controlling the speed of advance of the glass to a zone of the bath where the viscosity of the glass is controlled to regulate attenuation of the ribbon to a desired width and thickness as it is accelerated; constraining molten metal flow, at a first location in the region of the downstream end of said attenuation zone, to forward flow of molten metal entrained beneath the ribbon and counterflow of molten metal alongside the ribbon from downstream of said first location;
further constraining molten metal flow, at a second location spaced upstream from said first location and in the region of maximum acceleration of the glass, to forward flow of molten metal entrained beneath the accelerating glass and counterflow of molten metal alongside the ribbon from downstream of said second location; and
establishing lateral access into the region of the bath supporting the ribbon between said first and second locations for said counterflow of molten metal at said first location to ensure replenishment of the molten metal of the bath in said attenuation zone between said first and second locations by molten metal drawn inwardly from that counterflow at said first location.

12. A method according to claim 11, wherein the counterflow at the first location is directed alongside the ribbon through channels.

13. A method according to claim 11, comprising transversely dividing the zone between the first and second locations into a plurality of cells, constraining molten metal flow between each pair of adjacent cells to the forward flow entrained beneath the ribbon, and permitting counterflows of molten metal alongside the ribbon from the downstream cell of that pair to the upstream cell of that pair.

14. A method according to claim 11, including electromagnetically inducing flows of molten metal from the counterflows to enter beneath the ribbon.

15. A method of manufacturing flat glass of thickness in the range 2 mm to 3 mm comprising:
advancing a ribbon of glass along a molten metal bath;
attenuating the advancing glass by applying traction to the ribbon and controlling the speed of advance of the glass to a zone of the bath where the viscosity of the glass increases through the range $10^{5.2}$ poises to $10^7$ poises and the ribbon is attenuated to a desired width and thickness as it is accelerated to a speed of at least 10 m/minute;
constraining molten metal flow, at a first location in the region of the downstream end of said attenuation zone, to forward flow of molten metal entrained beneath the ribbon and counterflow of molten metal alongside the ribbon from downstream of said first location;
further constraining molten metal flow, at a second location spaced upstream from said first location and in the region of maximum acceleration of the glass, to forward flow of molten metal entrained beneath the accelerating glass and counterflow of molten metal alongside the ribbon from downstream of said second location; and
establishing lateral access into the region of the bath supporting the ribbon between said first and second locations for said counterflow of molten metal at said first location to ensure replenishment of the molten metal of the bath in said attenuation zone between said first and second locations by molten metal drawn inwardly from that counterflow at said first location.

16. A method according to claim 15, comprising transversely dividing the zone between the first and second locations into a plurality of cells, constraining molten metal flow between each pair of adjacent cells to the forward flow entrained beneath the ribbon, and permitting counterflows of molten metal alongside the ribbon from the downstream cell of that pair to the upstream cell of that pair.

17. A method according to claim 15, including electromagnetically inducing flows of molten metal from the counterflows to enter beneath the ribbon.

18. In an apparatus for making flat glass wherein the apparatus is of the type having a glass forming chamber having a bottom and side portions for containing a pool of supporting molten metal; delivery means at the entrance end of the forming chamber for delivering a supply of molten glass to the forming chamber to provide a layer of molten glass on the pool of supporting molten metal wherein the molten glass as it advances along the molten metal is cooled to form a continuous glass ribbon of a specified thickness wherein at least a portion of the cooling of the glass being by transfer of heat to the molten metal and means for continuously removing the glass ribbon from the forming chamber, the improvement comprising:
movable dam barriers mounted on the bottom of the forming chamber, each of said dam barriers comprising an outer cover of material which is substantially non-reactive with the molten metal and an inner body of material having a density greater than that of the molten metal.

19. The apparatus as set forth in claim 18 wherein at least one of said dam barriers comprises:
a cylindrical body; and wherein
means associated with said body prevents rolling motion of said body.

20. The apparatus as set forth in claim 18 wherein the cover is made of graphite and the body has a density sufficiently greater than the density of the molten metal to increase the density of the body and cover in combination to be effectively greater than that of molten metal.

21. The apparatus as set forth in claim 18 wherein said means for continuously removing the glass ribbon from the forming chamber comprises:

means for horizontally removing the glass ribbon from the forming chamber.

* * * * *